(12) United States Patent
Francisco et al.

(10) Patent No.: US 8,596,568 B2
(45) Date of Patent: Dec. 3, 2013

(54) EXHAUST SILENCER WITH BAFFLES (75) Inventors: Jay M. Francisco, Chula Vista, CA (US); James C. Napier, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 218 days.

(21) Appl. No.: 13/094,179

(22) Filed: Apr. 26, 2011

(65) Prior Publication Data

US 2012/0273611 A1 Nov. 1, 2012

(51) Int. Cl.
B64C 1/40 (2006.01)
B64C 23/00 (2006.01)

(52) U.S. Cl.
USPC .............................................. 244/1 N; 244/58

(58) Field of Classification Search
USPC ............ 244/1 N, 58; 181/210, 211, 213, 264, 181/266, 268, 272, 273, 276
See application file for complete search history.

(56) References Cited

U.S. PATENT DOCUMENTS

| | | | |
|---|---|---|---|
| 2,039,800 A | 5/1936 | Jack | |
| 2,213,614 A | 9/1940 | Scarritt | |
| 2,348,706 A * | 5/1944 | Batchelor et al. | 181/225 |
| 2,404,589 A * | 7/1946 | Monaghan | 181/232 |
| 2,998,860 A | 9/1961 | Everett | |
| 3,011,584 A | 12/1961 | Lemmerman et al. | |
| 3,286,787 A * | 11/1966 | Wirt | 181/213 |
| 3,515,242 A * | 6/1970 | Lyttle | 181/268 |
| 3,620,329 A | 11/1971 | Wenzlaff | |
| 3,672,464 A * | 6/1972 | Rowley et al. | 181/253 |
| 3,679,024 A * | 7/1972 | Kirkland et al. | 181/273 |
| 3,715,009 A | 2/1973 | Smith et al. | |
| 3,739,872 A | 6/1973 | McNair | |
| 4,091,892 A | 5/1978 | Hehmann et al. | |
| 4,244,441 A * | 1/1981 | Tolman | 181/213 |
| 4,421,455 A | 12/1983 | Tomren | |
| 4,436,481 A | 3/1984 | Linder | |
| 4,531,356 A | 7/1985 | Linder | |
| 4,645,032 A | 2/1987 | Ross et al. | |
| 4,927,342 A | 5/1990 | Kim et al. | |
| 4,979,587 A | 12/1990 | Hirt et al. | |
| 5,097,656 A | 3/1992 | Napier | |
| 5,140,819 A | 8/1992 | Napier et al. | |
| 5,162,620 A | 11/1992 | Ross et al. | |

(Continued)

FOREIGN PATENT DOCUMENTS

GB 1198625 7/1970

OTHER PUBLICATIONS

The European Search Report dated Jun. 6, 2012 for European Application No. 12162773.1.

*Primary Examiner* — Philip J Bonzell
(74) *Attorney, Agent, or Firm* — Kinney & Lange, P.A.

(57) ABSTRACT

An exhaust silencer assembly includes an exhaust duct and an exhaust silencer. The exhaust silencer is disposed about the exhaust duct and has a plurality of solid baffles and at least one perforated baffle The exhaust silencer assembly is disposed downstream of an auxiliary power unit and at least partially attenuates the downstream noise of the combustion gases that result from operation of the auxiliary power unit. In one embodiment, at least one of the plurality of solid baffles is disposed to extend axially between generally radially extending solid baffles, perforated baffle(s), or partially perforated baffles. The axially extending solid baffle allows for cavity depth variation in the silencer to optimize tuning of particular frequencies from the auxiliary power unit.

15 Claims, 5 Drawing Sheets

(56) References Cited

U.S. PATENT DOCUMENTS

| | | | |
|---|---|---|---|
| 5,183,976 A * | 2/1993 | Plemons, Jr. | 181/264 |
| 5,265,408 A | 11/1993 | Sheoran et al. | |
| 5,373,691 A | 12/1994 | Gardner et al. | |
| 5,491,308 A | 2/1996 | Napier et al. | |
| 5,655,359 A | 8/1997 | Campbell et al. | |
| 5,687,563 A | 11/1997 | Thompson, Jr. | |
| 5,706,651 A | 1/1998 | Lillibridge et al. | |
| 5,943,856 A | 8/1999 | Lillibridge et al. | |
| 6,092,360 A | 7/2000 | Hoag et al. | |
| 6,094,907 A | 8/2000 | Blackner | |
| 6,415,595 B1 | 7/2002 | Wilmot, Jr. et al. | |
| 6,439,540 B1 | 8/2002 | Tse | |
| 6,615,576 B2 * | 9/2003 | Sheoran et al. | 60/39.5 |
| 6,695,094 B2 | 2/2004 | Moffat et al. | |
| 6,704,625 B2 | 3/2004 | Albero et al. | |
| 6,942,181 B2 | 9/2005 | Dionne | |
| 6,957,569 B1 | 10/2005 | Napier et al. | |
| 7,093,447 B2 | 8/2006 | Thompson et al. | |
| 7,104,072 B2 | 9/2006 | Thompson | |
| 7,124,856 B2 | 10/2006 | Kempton et al. | |
| 7,367,424 B2 * | 5/2008 | Brown et al. | 181/250 |
| 7,431,125 B2 * | 10/2008 | Williams | 181/214 |
| 7,765,784 B2 * | 8/2010 | Lwasa et al. | 60/39.5 |
| 7,784,283 B2 * | 8/2010 | Yu et al. | 60/770 |
| 2002/0139120 A1 | 10/2002 | Sheoran et al. | |
| 2005/0158173 A1 | 7/2005 | Nguyen et al. | |
| 2005/0268593 A1 | 12/2005 | Hagshenas | |
| 2006/0163425 A1 * | 7/2006 | Brown et al. | 244/53 B |
| 2006/0180388 A1 * | 8/2006 | Brown et al. | 181/250 |
| 2006/0207826 A1 * | 9/2006 | Williams | 181/214 |
| 2008/0078863 A1 | 4/2008 | Lwasa et al. | |
| 2008/0236939 A1 * | 10/2008 | Napier et al. | 181/224 |
| 2009/0078496 A1 * | 3/2009 | Francisco et al. | 181/213 |
| 2011/0271686 A1 * | 11/2011 | Francisco et al. | 60/783 |

* cited by examiner

EXHAUST SILENCER WITH BAFFLES

BACKGROUND

The present invention relates to noise suppression systems. In particular, the present invention relates to noise suppression systems for use with gas turbines such as aircraft auxiliary power units (APUs).

Large commercial aircraft typically include on-board APUs, located in the tail sections of the aircraft, to provide electrical power and compressed air for systems throughout the aircraft. When an aircraft is on the ground, the primary propulsion engines of the aircraft are shut down, and the APU provides the main power source for a variety of systems and serves as a main engine starter. The APU may also provide power during in-flight operations for various systems.

For commercial passenger aircraft in particular, there is widespread demand by the airline industry to maintain noise levels generated by turbines below defined limits. This is particularly important at ground service stations for the aircraft, where ground crews load and unload luggage, fuel and provision the aircraft. When the aircraft is on the ground, minimizing APU noise is therefore desirable.

One technique for attenuating the exhaust noise of an APU involves placing an exhaust silencer directly downstream from the APU exhaust diffuser. This allows the exhaust silencer to attenuate the noise of the combustion gases as the gases exit the exhaust diffusers. The exhaust silencer is typically placed directly downstream from the APU exhaust diffuser to minimize the overall axial length of the APU. However, the combustion gases exit the APU at high velocities, and create a turbulent mixing downstream from the exhaust diffuser. The turbulent mixing generates a substantial amount of additional noise downstream from the exhaust diffuser.

To address this issue, it is common to increase the size of the exhaust silencer, and thereby increase the size of the APU housing structure so as to suppress noise generated downstream of the exhaust diffuser. However, such a solution undesirably increases the overall size and weight of the aircraft tail section.

SUMMARY

An exhaust silencer assembly includes an exhaust duct and an exhaust silencer. The exhaust silencer is disposed about the exhaust duct and has a plurality of solid baffles and at least one perforated baffle. The exhaust silencer assembly is disposed downstream of an auxiliary power unit and at least partially attenuates the downstream noise of the combustion gases that result from operation of the auxiliary power unit.

DETAILED DESCRIPTION

Figure 1:
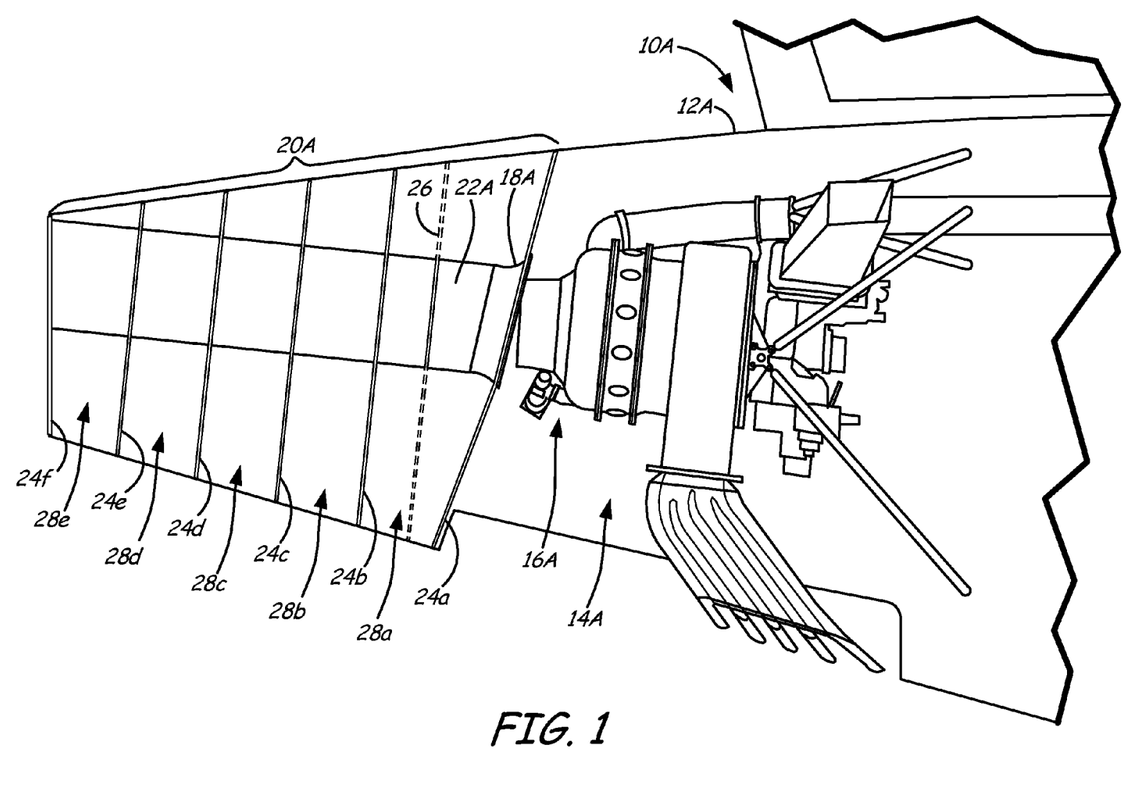
FIG. 1 is a schematic view of an aircraft tail section, which includes an exhaust silencer assembly in use with an on-board APU.

FIG. 1 is a schematic view of aircraft tail section 10A, which includes an exterior structure 12A and an APU nacelle 14A. APU nacelle 14A is a compartment within exterior structure 12A that contains an APU 16A, an eductor 18A, an exhaust silencer 20A, and exhaust duct 22A. Exhaust silencer 20A includes solid baffles 24a, 24b, 24c, 24d, 24e, and 24f and at least one perforated baffle 26. Together solid baffles 24a, 24b, 24c, 24d, 24e, and 24f form a plurality of tuned chambers 28a, 28b, 28c, 28d, and 28e.

APU nacelle 14A houses APU 16A therein. Eductor 18A is arranged downstream of and is in fluid communication with APU 16A. Eductor 18A is an airflow system that extends annularly around at least a portion of an exhaust diffuser portion of the APU 16A. Eductor 18A extends axially to connect to and communicate with exhaust duct 22A. Exhaust silencer 20A is disposed annularly around exhaust duct 22A and in some instances eductor 18A, and is configured to attenuate the noise of APU 16A. More particularly, exhaust silencer 20A has an array of solid baffles 24a, 24b, 24c, 24d, and 24e, and 24f spaced apart axially from one another and extending annularly around educator 18A and exhaust duct 22A to form tuned chambers 28a, 28b, 28c, 28d, and 28e to attenuate noise that results from the combustion gases of APU 16A. As shown in FIG. 1, solid baffles 24a, 24b, 24c, 24d, and 24e, and 24f and first perforated baffle 26 extend generally radially around exhaust duct 22A to exterior structure 12A.

In the embodiment shown in FIG. 1, perforated baffle 26 connects to and extends annularly about exhaust duct 22A downstream of first solid baffle 24a and is disposed upstream of second solid baffle 24b. Perforated baffle 26 has a plurality of holes extending therethrough to allow sound of a certain frequency to pass therethrough. Together first solid baffle 24a and second solid baffle 24b connect to exhaust duct 22A and form first tuned chamber 28a with first perforated baffle 26 disposed therein. Similarly, second solid baffle 24b and third solid baffle 24c form second tuned chamber 28b axially downstream of first tuned chamber 28a. Third solid baffle 24c and fourth solid baffle 24d form third tuned chamber 28c downstream of second tuned chamber 28b. Fourth tuned chamber 28d, and fifth tuned chamber 28e are formed in a similar manner by solid baffles 24d, 24e, and 24f, respectively.

In the embodiment shown in FIG. 1, first solid baffle 24a is disposed substantially flush with leading edge of eductor 18A. In other embodiments, first solid baffle 24a can be disposed downstream (as defined by direction of combustion air flow from APU 16A) of eductor 18A along exhaust duct 22A. In the embodiment shown in FIG. 1, perforated baffle 26 is disposed downstream of the exhaust portion of APU 16A at a distance that is between about 100% of the inner diameter of the exhaust duct 22A to about 150% of the inner diameter of the exhaust duct 22A. In other embodiments, the perforated baffle 26 can be disposed in a different location further upstream or downstream relative the APU 16A, and perforated baffle 26 can comprise a plurality of baffles. Additionally, the number of solid baffles and chambers can be varied in order to achieve desired noise attenuation in particular frequency ranges so as to meet aviation noise standards.

APU 16A is an on-board APU turbine engine that includes a turbine portion and exhaust diffuser (not shown) and provides electrical power to the aircraft. APU 16A also includes additional components (not shown) that facilitate transfer of electrical power such as generators and gearboxes during the operation of APU 16A. Eductor 18A draws cooling air from APU nacelle 14A and mixes the cooling air with combustion gases from APU 16A. Exhaust duct 22A communicates with eductor 18A and provides a channel for expelling the combustion and cooling gases from aircraft tail section 10. Exhaust duct 22A is an annular metal tube connected to eductor 18A. In the embodiment shown in FIG. 1, exhaust duct 22A is perforated in a manner similar to perforated baffle 26 downstream of perforated baffle 26 and does not have perforations (i.e. is a solid sheet metal tube) upstream thereof.

The turbulent mixing of the combustion gases and the cooling gases generates a substantial amount of downstream noise. Exhaust duct 22A provides a suitable residence time for the combustion gases to generate the downstream noise before reaching desired portions of exhaust silencer 20A. As is know in the art and disclosed by Sheoran et al., U.S. Patent Publication No. 2002/0139120 and Napier et al., U.S. Patent Publication No. 2008/0236939, both of which are incorporated herein by reference, chambers 28a, 28b, 28c, 28d, and 28e of exhaust silencer 20A are tuned to resonances of the combustion and cooling gases to attenuate noise and meet aviation noise standards. Disposing first solid baffle 24a at or adjacent eductor 18A and utilizing perforated baffle 26 disposed in first chamber 28a upstream of perforated exhaust duct 22A allows exhaust silencer 20A additional space in exterior structure 12A so as to more effectively attenuate noise and thereby meet aviation noise standards.

Figure 1A:
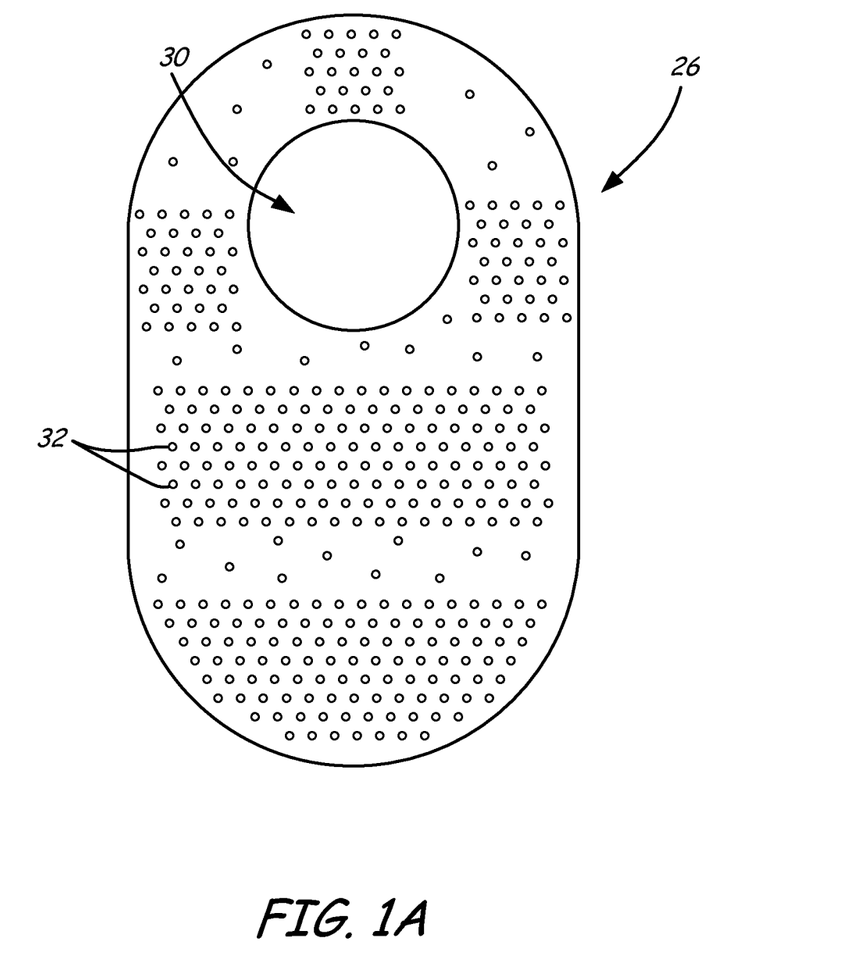
FIG. 1A is a schematic view of a perforated baffle of the exhaust silencer assembly of FIG. 1.

FIG. 1A shows perforated baffle 26 from exhaust silencer 20A of FIG. 1. Perforated baffle 26 includes an exhaust duct hole 30 and a plurality of noise attenuating holes 32.

Like solid baffles 24a, 24b, 24c, 24d, 24e, and 24f (FIG. 1), perforated baffle 26 comprises a sheet metal most commonly constructed of stainless steel, titanium, or nickel based alloy. Exhaust duct hole 30 is sized to receive exhaust duct 22A (FIG. 1) when installed. In the embodiment shown, noise attenuating holes 32 extend through perforated baffle 26 and are disposed across substantially the entire surface thereof. As illustrated in FIG. 1A, noise attenuating holes 32 are about 0.125 inches (0.32 cm) in diameter and are patterned so that the noise attenuating holes 32 take up between 20 and 30 percent of the surface area of perforated baffle 26. However, the size, shape, and pattern of noise attenuating holes 30 can vary from embodiment to embodiment depending on how exhaust silencer 20A (FIG. 1) is tuned to achieve desired noise attenuation.

Figure 2:
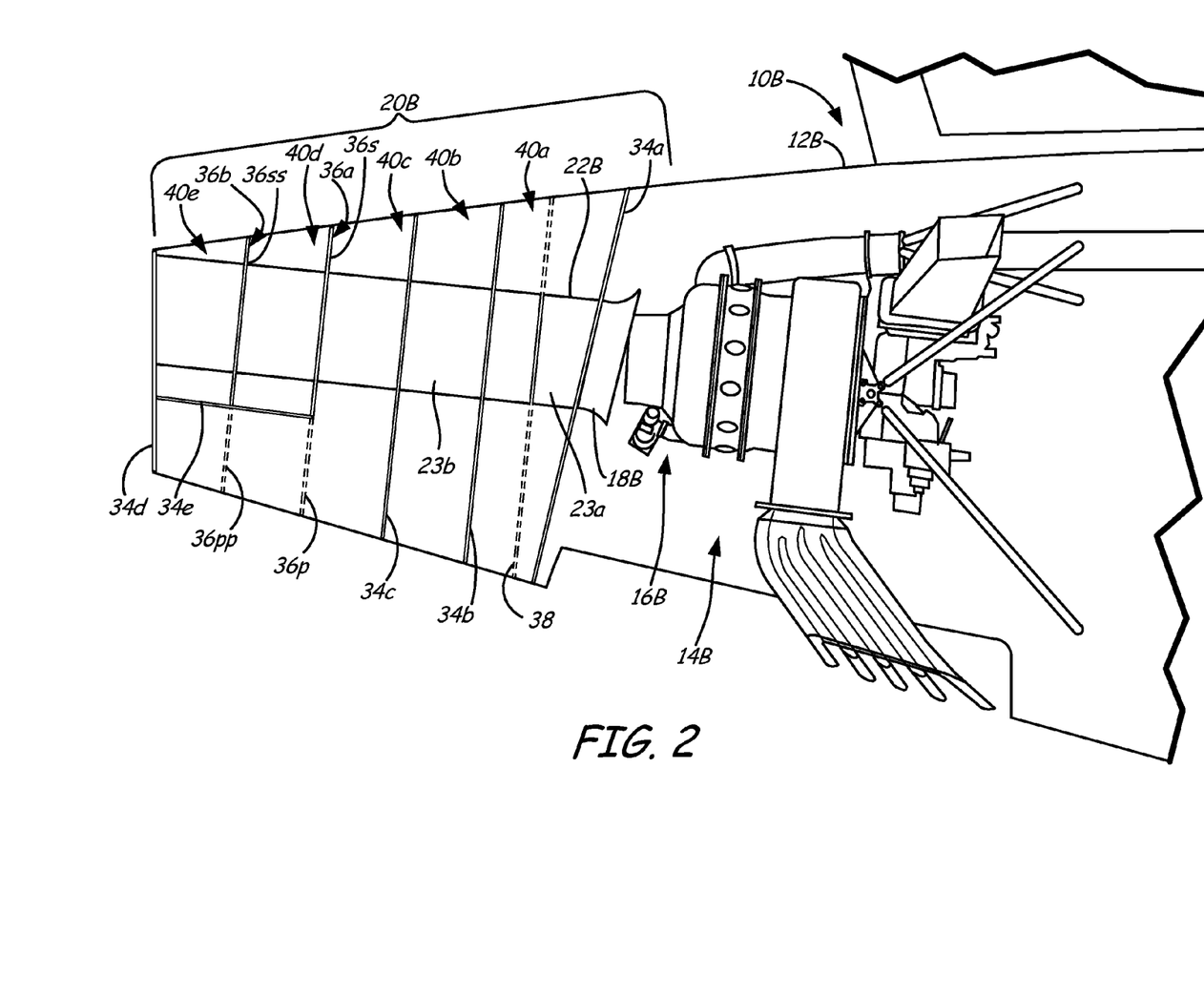
FIG. 2 is a schematic view of an aircraft tail section, which includes an alternative exhaust silencer assembly in use with an on-board APU.

FIG. 2 a schematic view of an alternative exhaust silencer 20B disposed in aircraft tail section 10B. Aircraft tail section 10B includes an exterior structure 12B and an APU nacelle 14B. APU nacelle 14B contains an APU 16B, an eductor 18B, an exhaust silencer 20B, and exhaust duct 22B. Exhaust silencer 20B includes solid baffles 34a, 34b, 34c, 34d, and 34e, partially perforated baffles 36a and 36b, and a perforated baffle 38. Together solid baffles 34a, 34b, 34c, 34d, and 34e and solid portions 36s and 36ss of partially perforated baffles 36a and 36b form a plurality of tuned chambers 40a, 40b, 40c, 40d, and 40e. As shown in FIG. 2, solid baffles 34a, 34b, 34c, and 34d, partially perforated baffles 36a and 36b, and a perforated baffle 38 extend generally radially around exhaust duct 22B to exterior structure 12B.

Exhaust silencer 20B is constructed in a manner similar to exhaust silencer 20A and can be used as an alternative or in addition to exhaust silencer 20A in order to achieve noise attenuation in particular frequency ranges so as to meet aviation noise standards.

As shown in FIG. 2, APU nacelle 14B houses APU 16B therein and exterior structure 12B houses all components including exhaust silencer 20B. Eductor 18B is arranged downstream of and is in fluid communication with APU 16B. Eductor 18B extends axially to connect to and communicate with exhaust duct 22B. Exhaust silencer 20B is disposed annularly around exhaust duct 22B adjacent eductor 18B, and is configured to attenuate the noise of combustion gases generated by APU 16B.

More particularly, exhaust silencer 20B has an array of solid baffles 34a, 34b, 34c, and 34d spaced apart axially from one another and extending annularly around exhaust duct 22B. Additionally, solid baffle 34e extends generally axially between partially perforated baffles 36a and 36b and between partially perforated baffle 36b and fourth solid baffle 34d. In the embodiment shown in FIG. 2, partially perforated baffles 36a and 36b have portions of solid construction 36s and 36ss radially above (as defined by the centerline of exhaust duct 22B) the connection with solid baffle 34e. Together solid baffles 34a, 34b, 34c, 34d, and 34e and the solid portions 36s and 36ss of partially perforated baffles 36a and 36b form tuned chambers 40a, 40b, 40c, 40d, and 40e.

In the embodiment shown in FIG. 2, perforated baffle 38 extends annularly about exhaust duct 22B downstream of first solid baffle 34a and upstream of second solid baffle 34b. Perforated baffle 38 has a plurality of holes extending therethrough to allow noise of a certain frequency to pass therethrough. Together first solid baffle 34a and second solid baffle 34b form first tuned chamber 40a with first perforated baffle 38 disposed therein. Similarly, second solid baffle 34b and third solid baffle 34c form second tuned chamber 40b axially downstream of first tuned chamber 40a. Third solid baffle 34c, solid portion 36s of perforated baffle 36a, fourth solid baffle 34d, and fifth solid baffle 34e form L shaped third tuned chamber 40c downstream of second tuned chamber 40b. Perforated portions 36p and 36pp of partially perforated baffles 36a and 36b are disposed in third tuned chamber 40c. Fourth tuned chamber 40d is disposed radially above third tuned chamber 40c, extends about exhaust duct 22B, and is formed by solid portions 36s and 36ss of partially perforated baffles 36a and 36b and fifth solid baffle 34e. Similarly, fifth tuned chamber 40e is formed by solid portion 36ss of partially perforated baffle 36b, fourth solid baffle 34d, and fifth solid baffle 34e, and is disposed downstream of fourth tuned chamber 40d. The number of baffles and chambers, and the location of the chambers relative to exhaust duct 22B can be varied in order to achieve noise attenuation in particular frequency ranges so as to meet aviation noise standards. The axial distance of the solid baffle 34e can also be varied from the outer diameter of the exhaust duct 22B, this allows exhaust silencer 20B to be tuned to specific frequencies to reduce noise from APU 16B.

First solid baffle 34a is disposed substantially adjacent a trailing edge of eductor 18B around exhaust duct 22B. In other embodiments, first solid baffle 34a can be disposed flush with leading edge of eductor 18B or along exhaust duct 22B at various desired lengths from APU 16B. In the embodiment shown in FIG. 2, perforated baffle 38 is disposed downstream of the exhaust portion of APU 16B at a distance that is between about 100% of the inner diameter of the exhaust duct 22B to about 150% of the inner diameter of the exhaust duct 22B. Exhaust duct 22B includes a section 23b that is perforated in a manner similar to perforated baffle 38 downstream of perforated baffle 38 and does not have perforations (i.e. is solid) in section 23a upstream thereof. In other embodiments, the perforated baffle 38 and partially perforated baffles 36a and 36b can be disposed in a different location further upstream or downstream relative the APU 16B and perforated baffle 38 can comprise a plurality of baffles in variously sized chambers in order to achieve noise attenuation in particular frequency ranges so as to meet aviation noise standards.

Chambers 40a, 40b, 40c, 40d, and 40e of exhaust silencer 20B are tuned to attenuate the noise frequency spectrum of the APU 16B to meet aviation noise standards. Disposing first solid baffle 34a adjacent eductor 18B and utilizing perforated baffle 38 disposed in first chamber 40a upstream of perforated exhaust duct 22B allows exhaust silencer 20B additional space in exterior structure 12B so as to more effectively attenuate noise and thereby meet aviation noise standards. Additionally, utilizing partially perforated baffles 36a and 36b allows exhaust silencer 20B to achieve noise attenuation in particular frequency ranges so as to meet aviation noise standards.

Figure 2A:
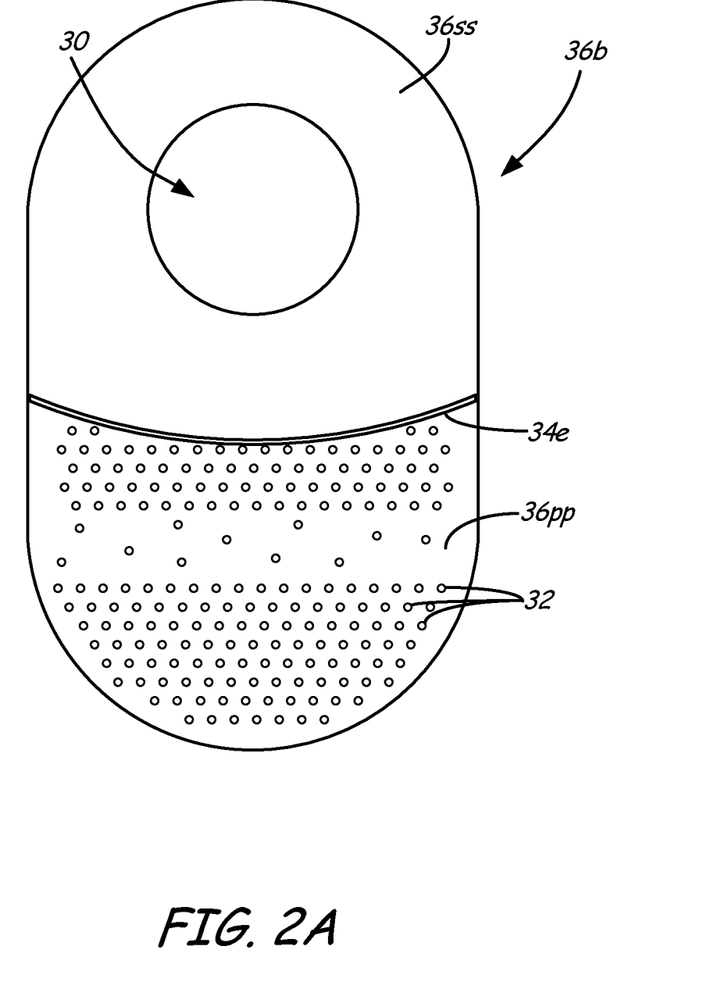
FIG. 2A is a schematic view of a partially perforated baffle and an axial baffle of the exhaust silencer assembly of FIG. 2.

FIG. 2A shows partially perforated baffle 36b from exhaust silencer 20B of FIG. 2. Partially perforated baffle 36b includes exhaust duct hole 30 and noise attenuating holes 32.

Noise attenuating holes 32 extend through perforated portion 36pp of partially perforated baffle 36b. Axially extending solid baffle 34e connects to partially perforated baffle 36b and divides perforated portion 36pp from solid portion 36ss. As shown in FIG. 2A, solid baffle 34e extends in an arc at a distance from exhaust duct hole 30 and divides chamber 40e from 40c (FIG. 2).

Figure 2B:
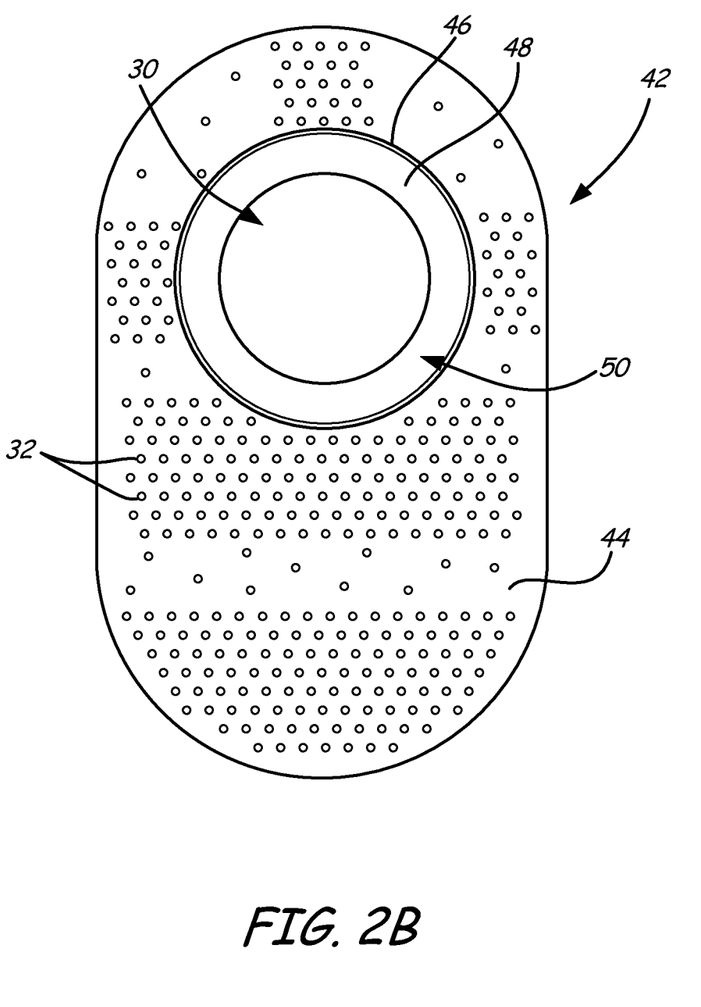
FIG. 2B is a schematic view of another embodiment of a partially perforated baffle and an axial baffle.

FIG. 2B shows another embodiment of partially perforated baffle 42. Partially perforated baffle 42 can be substituted for partially perforated baffle 36b and 36a of FIGS. 2 and 2A and includes exhaust duct hole 30 and noise attenuating holes 32.

Noise attenuating holes 32 extend through perforated portion 44 of partially perforated baffle 42. Axially extending solid baffle 46 connects to partially perforated baffle 42 and divides perforated portion 44 from solid portion 48. As shown in FIG. 2B, solid baffle 46 is disposed entirely around exhaust duct hole 30, and therefore, forms an attenuating chamber 50. Solid baffle 46 extends from partially perforated baffle 42 to adjacent solid baffles (not shown).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An exhaust silencer assembly comprising:
  an exhaust duct;
  an exhaust silencer disposed about the exhaust duct, the exhaust silencer including a plurality of solid baffles and at least one perforated baffle; and
  an auxiliary power unit arranged in communication with the exhaust duct, and wherein the at least one perforated baffle is disposed at a length along the exhaust duct from the auxiliary power unit that is 100% to 150% of an inner diameter of the exhaust duct,
  wherein one of the plurality of solid baffles connects to the at least one perforated baffle and extends generally axially to connect to an adjacent one of the plurality of solid baffles or a second similarly perforated baffle both of which extend generally radially around the exhaust duct.

2. The exhaust silencer assembly of claim 1, wherein the at least one perforated baffle includes perforations spaced across substantially an entire surface area thereof.

3. The exhaust silencer assembly of claim 1, wherein the at least one perforated baffle has a first solid portion with no perforations and a second portion with perforations.

4. The exhaust silencer assembly of claim 1, wherein the at least one perforated baffle includes perforations that are holes with a diameter of 0.125 inches (0.32 cm).

5. The exhaust silencer assembly of claim 1, wherein the exhaust duct is a solid structure upstream of the at least one perforated baffle and a perforated structure downstream of the at least one perforated baffle.

6. The exhaust silencer assembly of claim 1, wherein the solid baffles are positioned to form a plurality of chambers, and wherein the at least one perforated baffle is disposed in at least one of the plurality of chambers.

7. The exhaust silencer assembly of claim 6, wherein the perforations comprise between 20 percent and 30 percent of the entire surface area of the perforated baffle.

8. The exhaust silencer assembly of claim 1, further comprising an eductor disposed between the auxiliary power unit and the exhaust duct, wherein a first solid baffle of the plurality of solid baffles is disposed at or adjacent to the eductor.

9. The assembly of claim 8, wherein the at least one perforated baffle has perforations spaced across substantially an entire surface area thereof.

10. The assembly of claim 8, wherein the exhaust duct is a solid structure upstream of the at least one perforated baffle and a perforated structure downstream of the at least one perforated baffle.

11. The assembly of claim 8, wherein the at least one perforated baffle has a first solid portion with no perforations and a second portion with perforations.

12. The assembly of claim 11, wherein one of the plurality of solid baffles connects to the at least one perforated baffle between the first solid portion and the second portion with perforations and extends generally axially to connect to an adjacent one of the plurality of solid baffles or a second similarly perforated baffle both of which extend generally radially around the exhaust duct.

13. An auxiliary power unit assembly, comprising:
  an auxiliary power unit;
  an exhaust duct located downstream from the auxiliary power unit for receiving combustion gases emitted from the auxiliary power unit; and
  an exhaust silencer extending annularly to about the exhaust duct, the exhaust silencer including a plurality of axially spaced solid baffles and at least one perforated baffle, wherein the solid baffles are positioned to form a plurality of chambers, and wherein the at least one perforated baffle is disposed in one of the plurality of chambers at a length along the exhaust duct from the auxiliary power unit that is 100% to 150% of an inner diameter of the exhaust duct.

14. An aircraft tail section comprising:
  an auxiliary power unit;
  an eductor disposed downstream from the auxiliary power unit for receiving combustion gases emitted from the auxiliary power unit;
  an exhaust duct connected to the eductor and extending downstream therefrom to direct the combustion gases out of the aircraft tail section; and
  an exhaust silencer connected to and extending annularly around a portion of the exhaust duct, the exhaust silencer including a plurality of axially spaced solid baffles and at least one perforated baffle, wherein the solid baffles are positioned to form a plurality of chambers, and wherein the at least one perforated baffle is disposed in one of the plurality of chambers at a length along the exhaust duct from the auxiliary power unit that is 100% to 150% of an inner diameter of the exhaust duct,
  wherein one of the plurality of solid baffles connects to the at least one perforated baffle and extends generally axially to connect to an adjacent one of the plurality of solid baffles or a second similarly perforated baffle both of which extend generally radially around the exhaust duct.

15. The aircraft tail section of claim 14, wherein the exhaust duct is a solid structure upstream of the at least one perforated baffle and a perforated structure downstream of the at least one perforated baffle.

* * * * *